(12) United States Patent
Ferrari

(10) Patent No.: US 6,264,590 B1
(45) Date of Patent: Jul. 24, 2001

(54) TOOL HOLDER UNIT FOR CHUCK MOUNTING HEADS

(75) Inventor: Maurizio Ferrari, Pizzighettone (IT)

(73) Assignee: JOBS S.p.A., Fraz Montale (IT)

( * ) Notice: Subject to any disclaimer, the term of this patent is extended or adjusted under 35 U.S.C. 154(b) by 0 days.

(21) Appl. No.: 09/612,599

(22) Filed: Jul. 7, 2000

(30) Foreign Application Priority Data

Jul. 7, 1999 (IT) .............................................. BO99A0378

(51) Int. Cl.[7] .............................. B23Q 3/157; B23C 9/00
(52) U.S. Cl. ................................ 483/13; 408/61; 409/134; 409/137
(58) Field of Search .............................. 483/13; 409/137, 409/134, 230; 29/DIG. 86, DIG. 78, DIG. 94; 408/61

(56) References Cited

U.S. PATENT DOCUMENTS

| | | | |
|---|---|---|---|
| 3,828,649 | * | 8/1974 | Lecailtel ................................ 409/137 |
| 4,037,982 | * | 7/1977 | Clement ................................. 408/61 |
| 4,563,115 | * | 1/1986 | Abe et al. .............................. 409/134 |
| 4,652,190 | * | 3/1987 | Corsi ..................................... 409/137 |
| 4,957,148 | * | 9/1990 | Shoda ................................ 409/137 X |
| 4,981,403 | * | 1/1991 | Katayama ......................... 409/137 X |
| 5,632,579 | * | 5/1997 | Susnjara ................................ 409/137 |
| 5,791,842 | * | 8/1998 | Sugata ................................... 409/137 |

FOREIGN PATENT DOCUMENTS

4313658 * 6/1994 (DE) ..................................... 409/137

* cited by examiner

*Primary Examiner*—William Briggs
(74) *Attorney, Agent, or Firm*—Pillsbury Winthrop LLP

(57) ABSTRACT

The invention relates to a unit for holding a tool for chuck mounting heads used in machining where chips are removed from the worked part and waste material consequently produced. The unit comprises: a tool holder spindle designed to be attached to the chuck of the head; and an extraction device associated to the spindle and comprising an annular manifold comprising a first pipe which extends from a first end giving onto an area close to the tool and ends at a second end equipped with a first union designed to be quickly connected with the inside of a second union which matches the first and which is located at a connection unit associated to the chuck mounting head; said first and second unions forming a detachable coupling designed to connect the extraction device, through a second pipe, to a pump that creates a flow of fluid at a defined pressure along the first pipe so as to remove the waste material produced by machining from the area close to the tool.

17 Claims, 6 Drawing Sheets

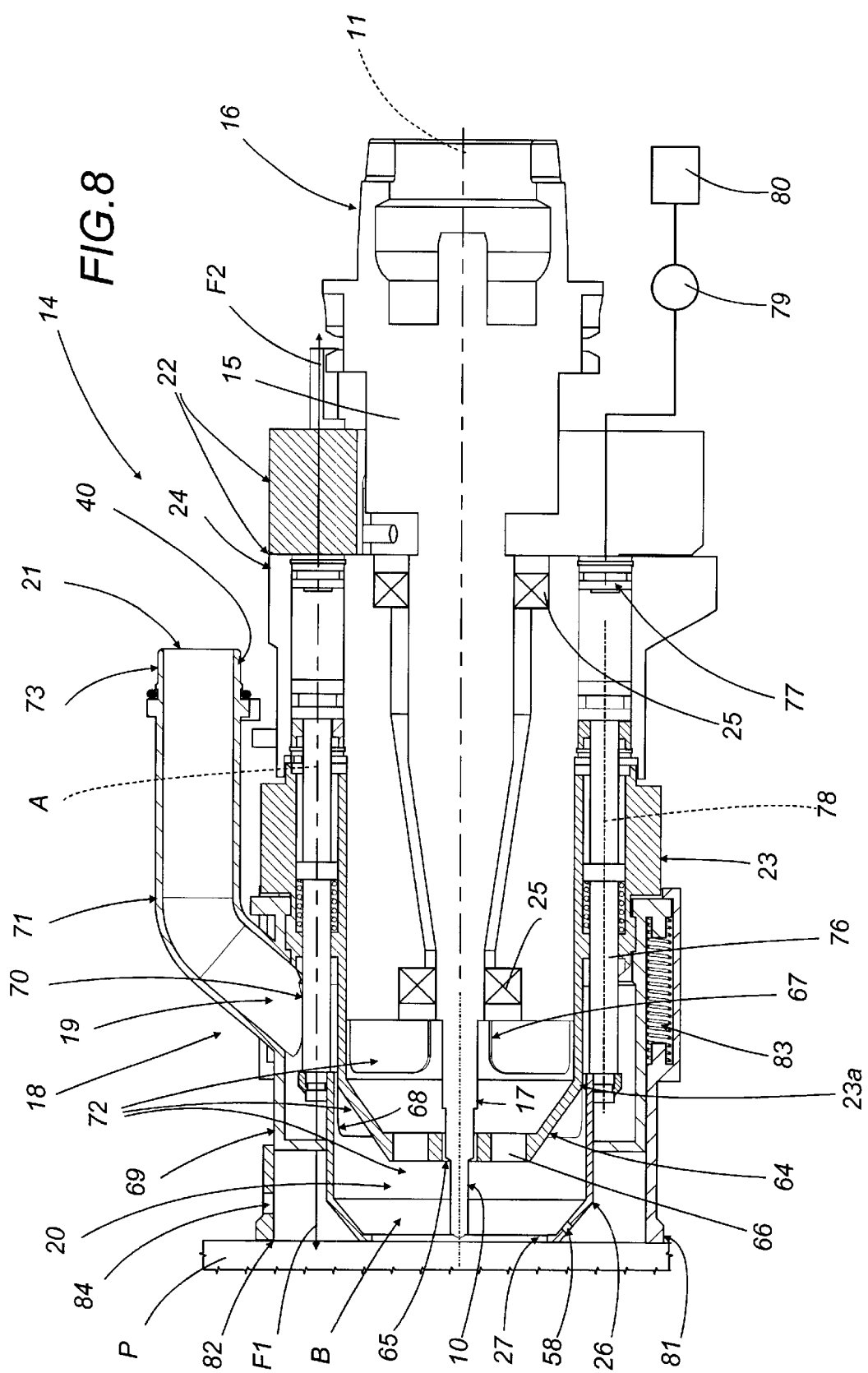

TOOL HOLDER UNIT FOR CHUCK MOUNTING HEADS

BACKGROUND OF THE INVENTION

The present invention relates to a tool holder unit for chuck heads.

The invention relates in particular to a tool holder unit for chuck mounting heads in automatic machine tools, machining centers and robotized systems, such as borers, routers, reamers and the like, able to perform dry machining with chip removal on unworked or semi-finished parts such as, for example, dies, moulds, electrodes, metal sheeting and structural parts of complex elements in general for the automotive, aeronautical and mechanical engineering industries in general, to which the present description refers, but without restricting the scope of the inventive concept.

Automatic machine tools of the type described above basically comprise main working modules supported by gantry mounting structures or uprights both of which may be mobile and which are usually equipped with an arm designed to support at one end of it, called "wrist", a chuck mounting head. The chuck in turn mounts the tool holder and the tool.

The supporting arm is therefore capable of motion in space along the three linear axes of a parallel kinematic reference system. The gantry structures and the uprights of any given machine tool can move along these axes thanks to the prismatic guides and ball screws with which the gantry structures or uprights themselves are equipped. In addition, the chuck mounting head is joined to the end of the supporting arm by a sleeve and can therefore turn about three axes of rotation so that it and the corresponding tool holder mounted on it can perform any straight-line or angular movement in space.

These machine tools are also equipped with magazines which contain a plurality of tools and the corresponding tool holders which the above mentioned arm can access at any time during the machining cycle in order to change the tool holders whenever a different tool is required to perform a different machine operation.

One of the main shortcomings of machines of this kind is due to the fact that, during operations such as routing, boring and reaming, and especially in the case of dry machining operations, the cutting tools create an enormous quantity of waste material in the form of relatively fine chips, dust and gases which, on escaping to the atmosphere, can be extremely dangerous for those working near the machines. This is especially true if the parts being machined are made, for example, of carbon fiber, graphite, plastic fiber or chalk, whose machining waste has a very high content of pollutants.

The aim of the present invention is to provide a tool holder unit that overcomes the above mentioned drawback by effectively solving the problem of environmental pollution in the room or rooms where the tools work, while remaining easy to change and automatically connectable to the chuck mounting head.

SUMMARY OF THE INVENTION

Accordingly, the present invention provides a tool holder unit for chuck mounting heads used in machining where chips are removed from the worked part and waste material consequently produced, said tool holder unit comprising: a tool holder spindle having a first end which connects with the chuck mounting head and a second end on which a tool is mounted; and an extraction device associated to the tool holder spindle and comprising at least one first pipe having at least one first end located in an area close to the tool and a second end equipped with connection means designed to connect the first pipe to corresponding second connection means associated to the chuck mounting head and connected to means for producing a flow of fluid at a defined pressure along the first pipe so as to remove from the area close to the tool the waste material produced by machining.

BRIEF DESCRIPTION OF THE DRAWINGS

The invention will now be described with reference to the accompanying drawings which illustrate preferred embodiments of it and in which:

FIG. 8 is a longitudinal section view, with some parts cut away, of the tool holder unit shown in FIG. 7;

DESCRIPTION OF THE PREFERRED EMBODIMENTS

Figure 1:
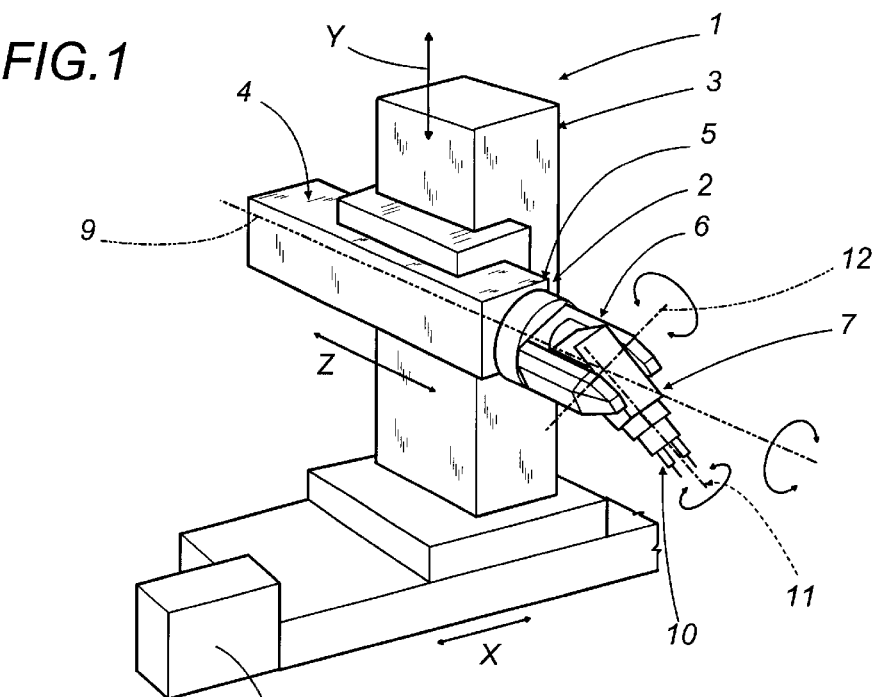
FIG. 1 is a schematic perspective view of a part of an automatic machine tool comprising a main horizontal working module that supports a chuck mounting head equipped with a tool holder unit made according to the present invention.
Figure 2:
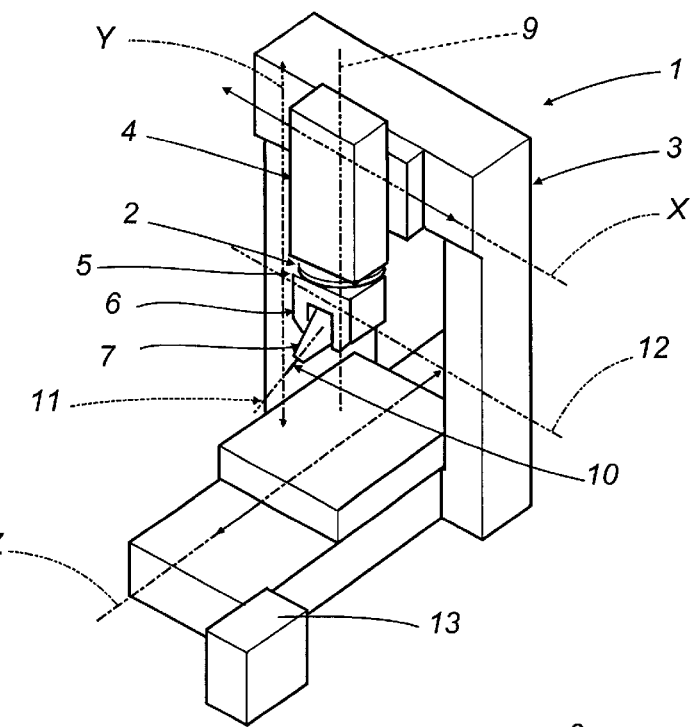
FIG. 2 is a schematic perspective view of a part of an automatic machine tool comprising a main vertical working module that supports a chuck mounting head equipped with a tool holder unit made according to the present invention.

With reference to FIGS. 1 and 2, the numeral 1 indicates as a whole a part of an automatic machine tool. The part of machine tool indicated is equipped with a main working module 2, which, in the embodiment illustrated in FIG. 1, is supported by a vertical structure 3, while, in the embodiment illustrated in FIG. 2, the main working module 2 is supported by a horizontal gantry structure 3. In both the embodiments illustrated, the structure 3 supports an arm 4 equipped at one end of it 5, called wrist, with a chuck 7 mounting head 6.

The working module 2 is capable of movement in space along the three linear axes X, Y and Z of a Cartesian coordinate system and, therefore, the arm 4 can also move along said three axes. Looking in more detail, the module 2 can move relative to the structure 3 on conventional prismatic guides and ball screws (not illustrated) with which the structure 3 is equipped.

Figure 9:
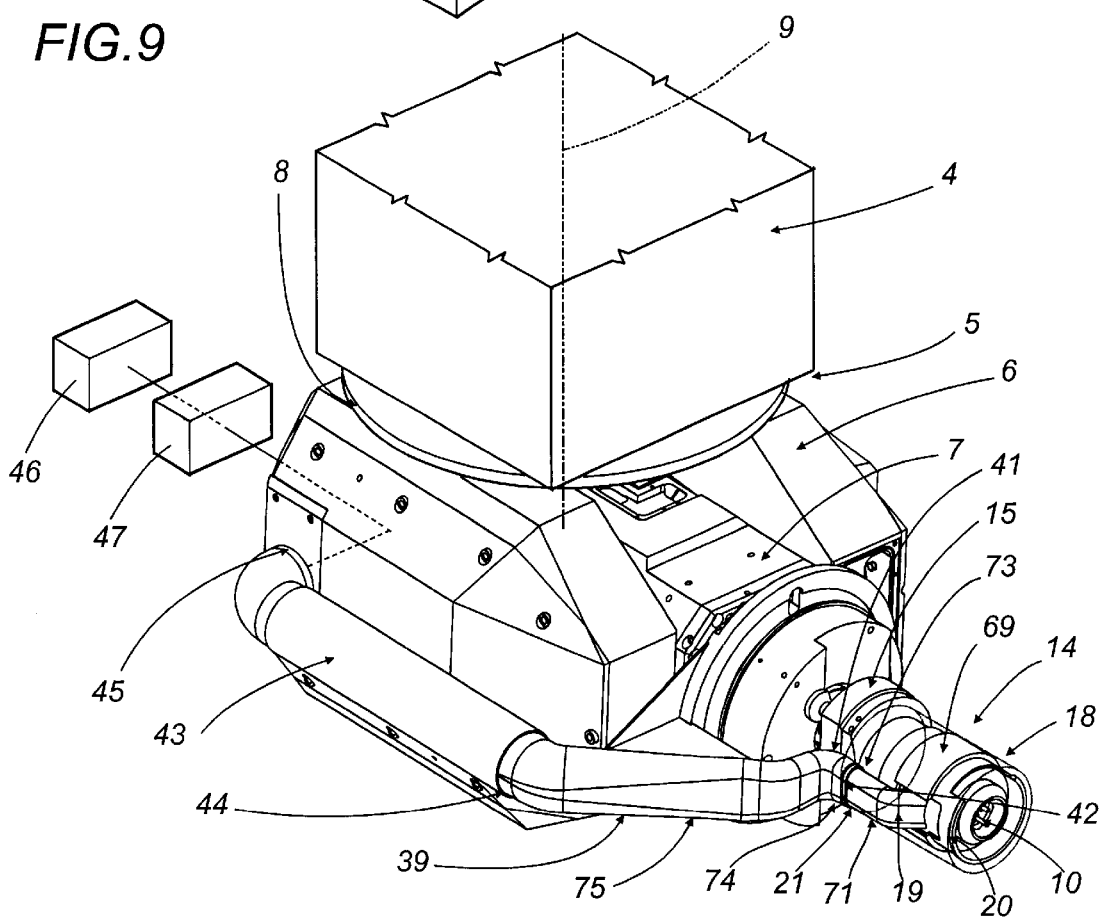
FIG. 9 is a schematic perspective view, with some parts cut away, of a chuck mounting head equipped with the unit shown in FIG. 7.
Figure 5:
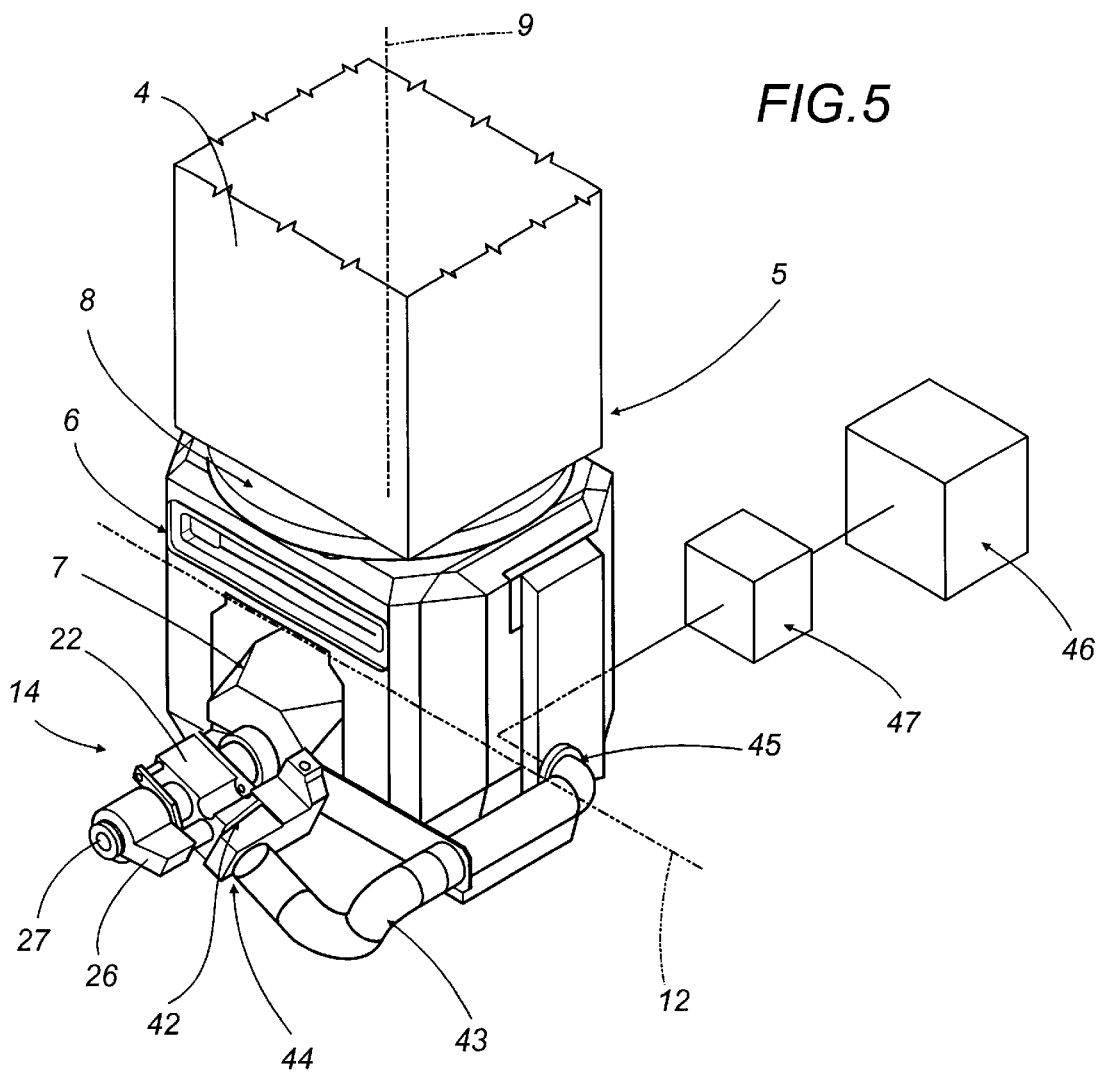
FIG. 5 is a schematic perspective view, with some parts cut away, of a chuck mounting head equipped with the unit shown in FIG. 3.

As shown in particular in FIGS. 5 and 9, the chuck 7 mounting head 6 is joined to the end 5 of the arm 4 by a sleeve 8 which enables the head 6 to turn about the axis 9 of the arm 4, parallel to the Cartesian axis Z. Further, the chuck 7, which transmits rotational cutting motion about its axis of rotation 11 to the tool 10, is connected to the head 6 by a supporting pin (not illustrated) that enables the chuck to rotate relative to the head 6 about an axis 12 perpendicular to the axis 9 and in a plane transversal to the axis 9 itself. Therefore, the head 6 and its corresponding chuck 7 can perform any straight-line or angular movement in space.

The part 1 of the machine tool illustrated in FIGS. 1 and 2 is also equipped with a conventional magazine, not illustrated in detail but represented schematically as a block 13, which contains a plurality of tool holder units that can be accessed by the arm 4 at any time during the machine cycle in order to change the tool holders and, hence, the tools, each time a different tool is required to perform a different machine operation.

Figure 3:
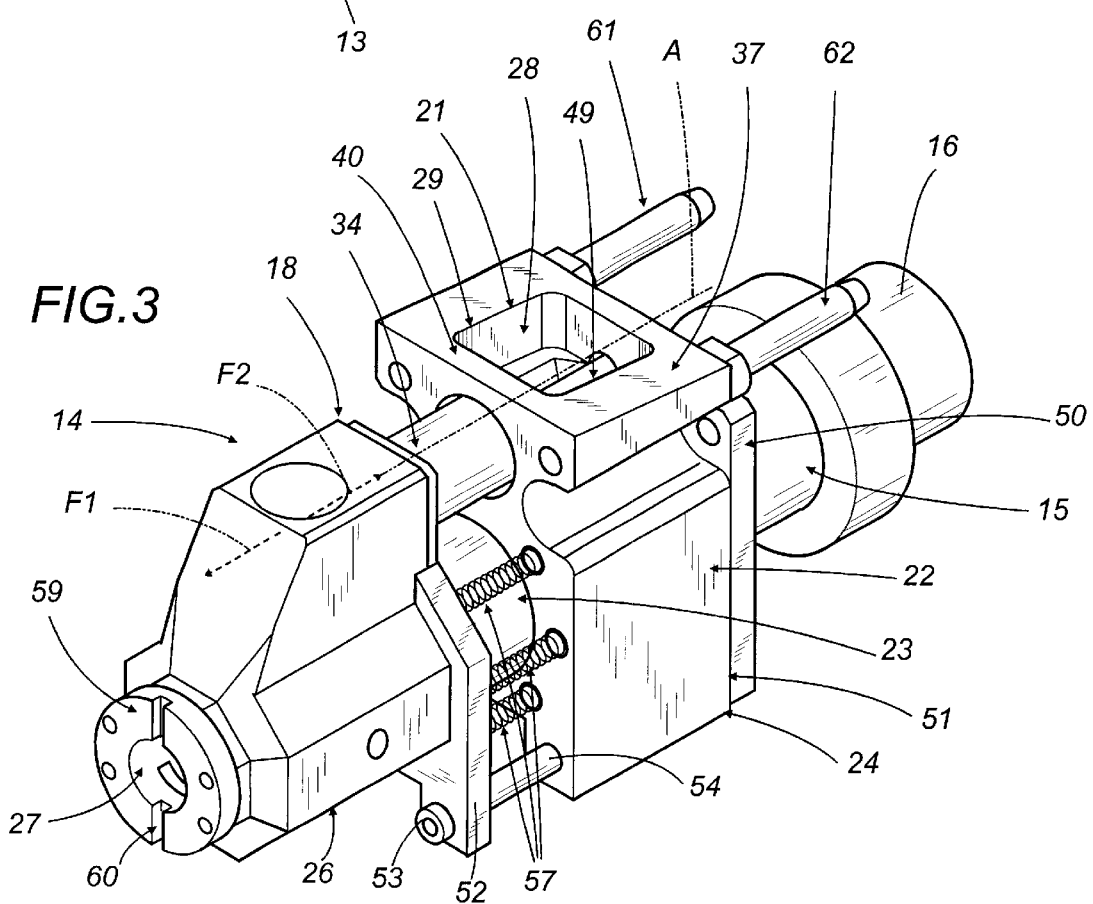
FIG. 3 is a schematic perspective view of a first embodiment of the tool holder unit made according to the present invention.
Figure 4:
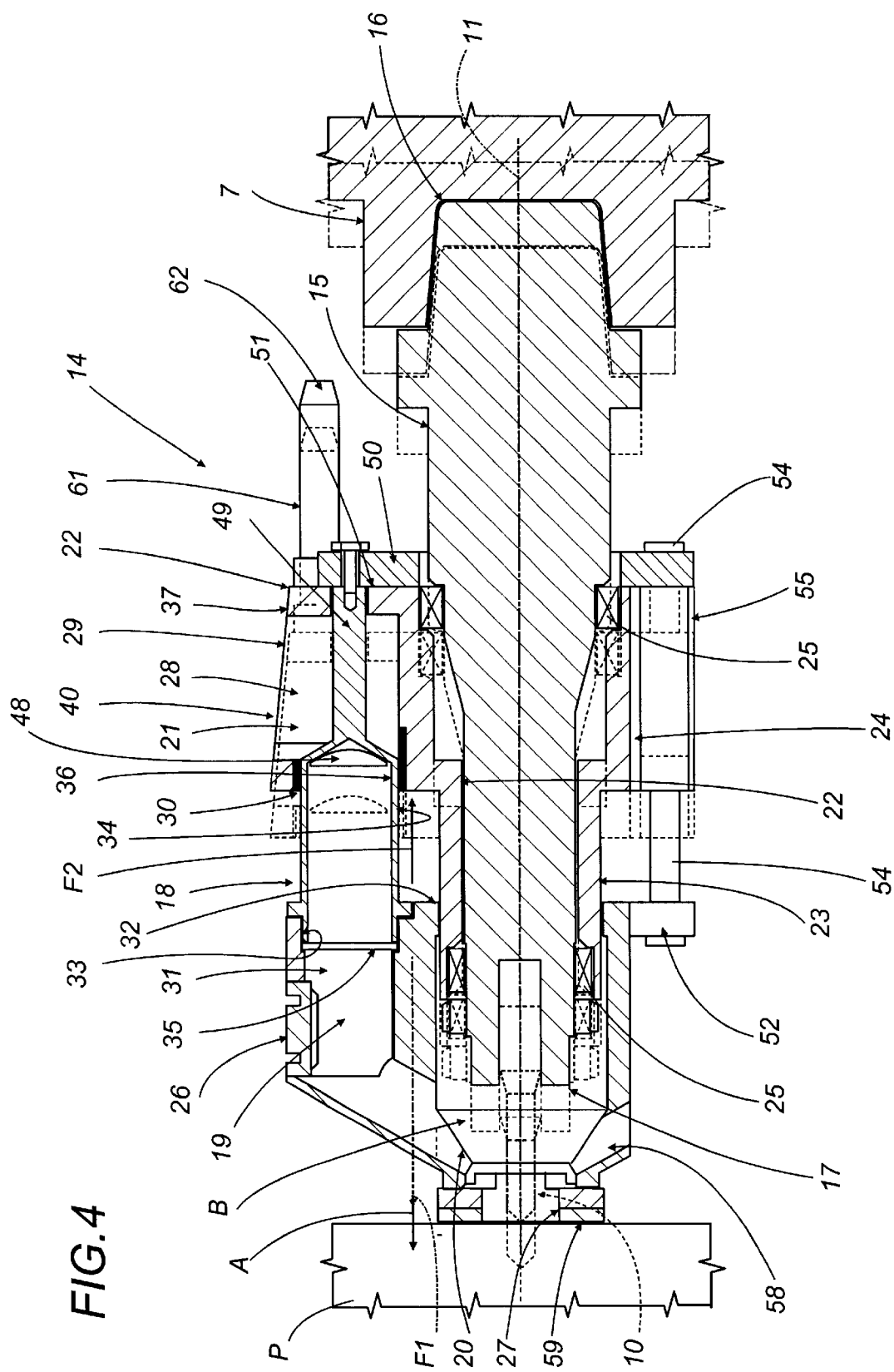
FIG. 4 is a longitudinal section view, with some parts cut away, of the tool holder unit shown in FIG. 3.

In FIGS. 3, 4, 5, 7, 8 and 9, the numeral 14 indicates as a whole a unit for holding a tool 10. The unit 14 is interchangeable and is designed to be quickly connected to and disconnected from the head 6 and the corresponding chuck 7. As shown in particular in FIGS. 4 and 8, the tool 10 may consist, depending on the machine operation required, of a cutting tool, a drill bit (as illustrated in FIGS. 4 and 8) or any similar tool 10 designed to perform a dry machine operation involving the removal of material from a part to be machined illustrated schematically as a sheet labeled P, and consequently producing a certain quantity of waste material. In the present specification, the term "waste material" denotes chippings, dust and gas of any kind and nature produced during the machining operations of the type mentioned above.

As shown in FIGS. 4 and 8, each unit 14 comprises a tool 10 mounting spindle 15 extending along the longitudinal axis of rotation 11 and having a first end 16, called taper, by which it is attached to the chuck 7 mounted in the head 6, and a second end 17 that carries a corresponding tool 10. The spindle 15 is associated to an extraction device 18 which comprises a first pipe 19 having a first end 20, located in an area B close to the tool 10, and a second end 21.

The extraction device 18 comprises a first casing 22 having a first tubular portion 23 and a second tubular portion 24 which, in the embodiment illustrated in FIGS. 3 and 4, is substantially box-shaped. The first casing 22 is fitted coaxially over the spindle 15 on a pair of rolling bearings 25 designed to prevent the relative axial movement between the first casing 22 and the spindle 15 but allowing the latter to turn freely about its axis 11 relative to the casing 22 itself. Coaxially fitted over the first tubular portion 23 of the first casing 22 there is a second substantially tubular casing 26 having an end mouth 27 which is coaxial with the spindle 15 and through which the tool 10 can pass. The second casing 26 is connected to the first portion 23 by a prismatic joint which allows the second casing 26 to move axially relative to the spindle 15 and relative to the first casing 22 along a defined path A substantially parallel to the axis 11 in both directions, labeled F1 and F2 in FIGS. 3, 4, 7 and 8, in such a way that the second casing 26 can move axially between a first position in which it is away from the first casing 22 and where the mouth 27 completely covers the tool 10 (this position being illustrated by the continuous line in FIGS. 4 and 8) and a position in which it is close to the first casing 22 (the dashed line in FIGS. 4 and 8 showing an intermediate position) and where the tool 10 has moved through the mouth 27 and has finished its work on part P.

In the embodiment illustrated in FIGS. 3 and 4, the first casing 22 has a peripheral aperture 28 going right through the wall of the first casing 22 and having a first end 29, located at the second end 21 of the first pipe 19, and a second end 30 facing the second casing 26 which comprises a first section 31 of the first pipe 19.

As shown in FIG. 4, the first section 31 of the first pipe 19 starts at the area B close to the tool 10 and ends at a corresponding end portion 32 of the second casing 26 opposite the mouth 27 and facing a corresponding aperture 33 coaxial with the second end 30 of the first aperture 28 which goes through the first casing 22.

The first section 31 of the first pipe 19 is connected to the through aperture 28 by means of a sleeve 34 having a first end 35 fixed at the aperture 33 of the second casing 26, where the first section 31 of the first pipe 19 ends, and a second end 36 that slides in sealed contact along the second end 30 of the through aperture 28 during the movement of the second casing 26 relative to the first casing 22 along the path A.

Figure 6:
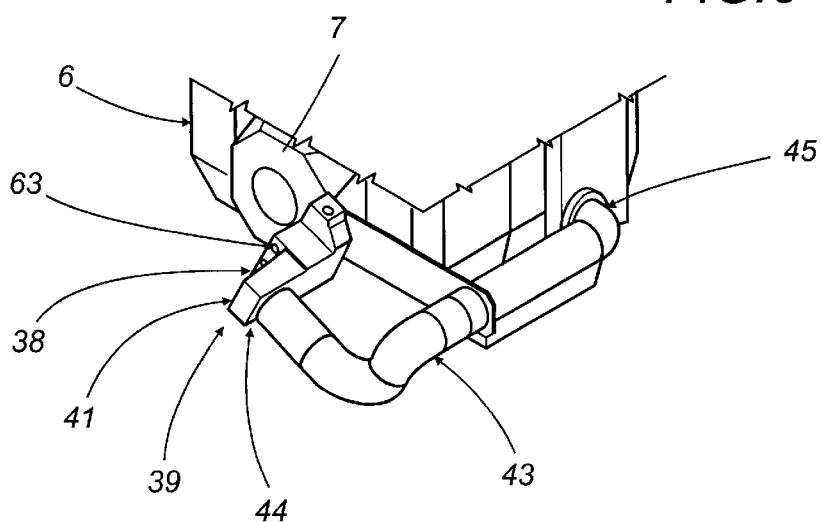
FIG. 6 is a schematic perspective view, with some parts cut away, of a detail from FIG. 5.

As shown in FIGS. 3, 4 and 6, at the first end 29 of the through aperture 28, the first casing has an inclined surface 37 that matches a second surface inclined in the direction opposite that of the surface 37 in such a way as form a quick, sealed connection. As shown in FIGS. 5 and 6, the second surface 38 is located at a first connection unit 39 associated to the chuck 7 mounting head 6.

Looking in more detail, the first and second inclined surfaces 37, 38 form corresponding first and second connection means, respectively labeled 40 and 41 as a whole, which form a detachable coupling 42 designed to rapidly connect the extraction device 18, and more precisely, the first pipe 19, to a second pipe 43 having a first end 44 connected to and giving onto the second inclined surface 38, and a second end 45 connected to a pump 46, schematically represented in FIG. 4 as a block 46, which creates a flow of fluid along the first pipe 19 that sucks out the waste material produced by the tool 10 as it machines the part P.

The pump 46 is connected to a container, schematically represented in FIG. 5 as a block 47, which collects the waste material.

The second pipe 43 and the pump 46 therefore constitute means for producing a flow of fluid at a defined pressure, designed to suck the waste material away from the area B and to convey it to the container 47, thus preventing it from escaping to the atmosphere.

As shown in FIG. 4, the second end 36 of the connecting sleeve 34 has a radial aperture 48 designed to enable air to flow between the first pipe 19 and the second pipe 43. The end 36 of the sleeve 34 is connected to a supporting shaft 49 fixed at one end to a mobile flange 50 made at the rear wall of the first casing 22 and facing the chuck 7.

The second casing 26 comprises a pair of brackets 52 connected to first ends 53 of corresponding shafts 54 supporting the second casing 26 itself, said shafts 54 being free to run in guides 55 made in the second portion 24 of the first casing 22 and being connected at their opposite ends 56 to the mobile flange 50.

As shown in FIG. 3, between the brackets 52 and the first casing 22 there is a plurality of springs 57 positioned around the first tubular portion of the first casing 22. The springs 57 act axially between the first fixed casing 22 and the brackets 52 in such a way that they tend to keep the second casing 26 in its furthest position away from the first casing 22 during the relative movement between the second casing 26 and the first casing 22.

In the area B close to the tool 10, the second casing 26 further comprises a through hole 58 located close to the end mouth 27 and designed to connect the area B with the outside atmosphere so as to allow the first pipe 19 to take in air from the outside during the suction stage of the pump 46.

In another embodiment, the area B close to the tool 10 communicates with the outside atmosphere through two radial grooves 60 made in the outer wall 59 of the end mouth 27.

The first casing 22 is also equipped with detachable positioning means 61 designed to connect the unit 14 to the connection unit 39 of the chuck 7 mounting head 6. The means 61 consist of a pair of locating pins 62 designed to be inserted into and removed from corresponding holes 63 made in the unit 39 itself in order to correctly position the unit 14 relative to the head 6.

During use, the head 6, after picking up a unit 14, rests the wall 59 of the mouth 27 against the part P being machined, which is fixed so it cannot move, and pushes the unit 14 against the part P in direction F1. The tool 10, turned by the spindle 15. The rotational drive motion of the chuck 7 is applied to the spindle 15 which causes the tool to rotate about the spindle axis 11 so that the tool 10 begins machining the part P.

During the feed motion of the unit 14 towards the part P, the second casing 26 moves axially relative to the first casing 22 along the path A in direction F2 towards the first casing 22 itself. The sleeve 34 slides within the aperture 28 so as to maintain the continuity of the pipe 19, which, thanks to the action of the pump 46, extracts the waste material by sucking air in through the hole 58 or through the radial grooves 60 made in the front wall 59 of the mouth 27 resting against the part P.

During the feed motion of the second casing 26 in direction F2, the tool 10 is pushed out through the mouth 27 and the springs 57 are compressed. When machining is completed and the unit 14 is moved away from the part P, the action of the springs 57 enables the second casing 26 to move back in direction F1 to its first position where it is away from the first casing 22 and covers the tool 10.

Figure 7:
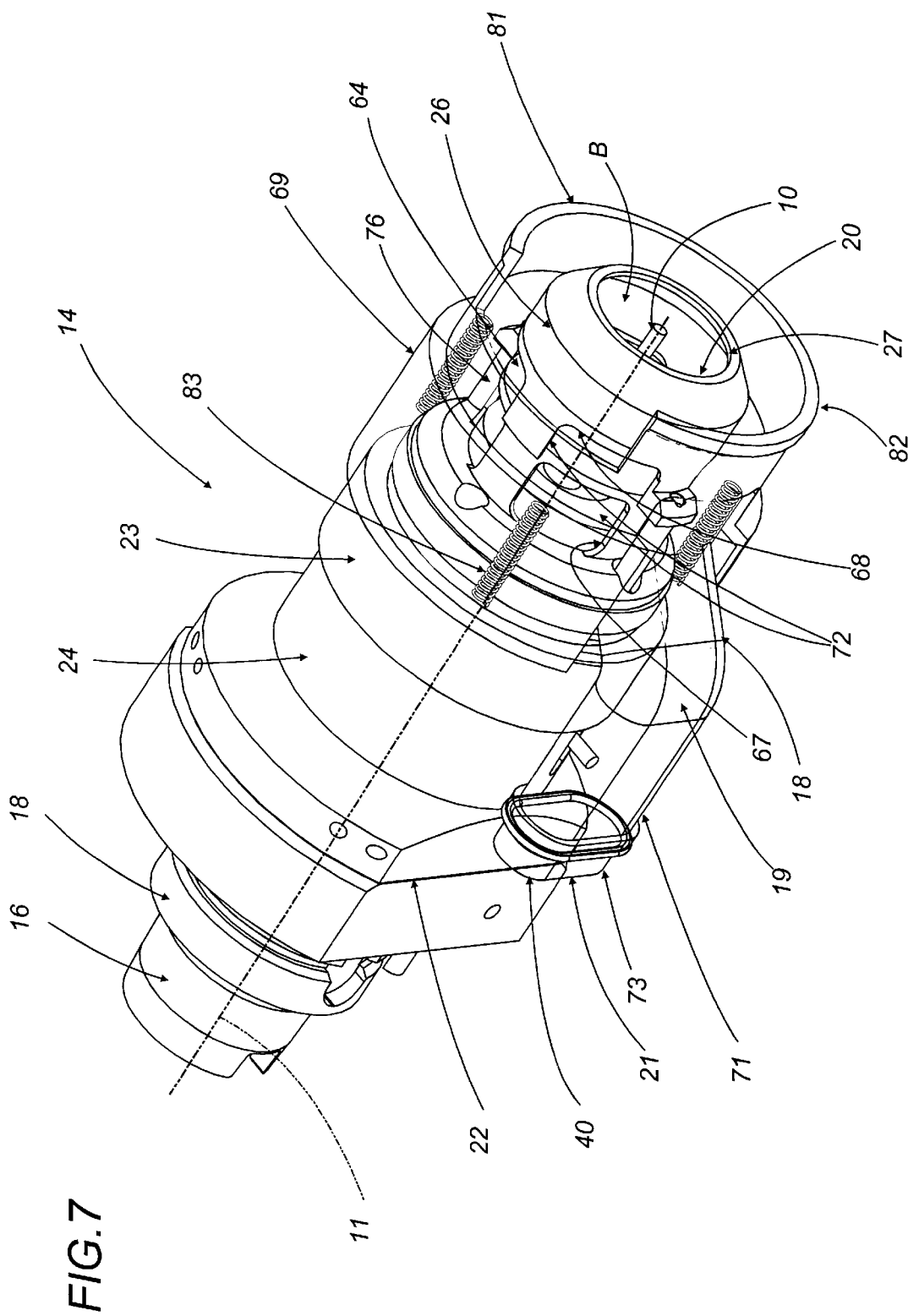
FIG. 7 is a schematic perspective view of a second embodiment of the tool holder unit made according to the present invention.

In the embodiment illustrated in FIGS. 7 and 8, the first tubular casing 22 is coaxial with the spindle 15 and, at an end 23a of its first tubular portion 23 facing the tool 10, has a truncated cone shaped wall 64 with a hole 65 for the passage of the tool 10 and a series of through holes 66 (shown in FIG. 8) and a plurality of first radial apertures 67 distributed at angular intervals around the first tubular portion 23 close to its end 23a.

The second tubular casing 26 is coaxial with the first casing 22 and, in addition to the mouth 27 coaxial with the tool 10, has a plurality of second lateral apertures 68 made at angular intervals around the casing 26 aligned with the angular positions of the first radial apertures 67. From the positions of the first and second apertures, it follows that during the relative movement of the second casing 22 relative to the first casing 22 along the latter's first tubular portion 23, the first and second apertures 67, 68 are aligned and tend to close each other.

Looking in more detail at the embodiment illustrated in FIGS. 7, 8 and 9, the extraction device 18 comprises an annular manifold 69 which is fitted coaxially and partially over both the first portion 23 of the first casing 22 and over the second casing 26 which can slide axially relative to the manifold 69 itself..

The manifold 69 has a radial aperture 70 connecting a first tubular section 71 of the pipe 19, extending from the aperture 70 to the second end 21 of the first pipe 19 itself, while the first end 20 of the pipe 19, located in the area B close to the tool 10, is connected to the aperture 70 not only through the second apertures 68 but also through the first apertures 67 connected to the area B by the through holes 66, which, like the second apertures 68, lead into the manifold 69.

From the above description, it follows that the apertures 67, 68 and the though holes 66 together form a second section 72 of the first pipe 19 extending between the first end 20 and the radial aperture 70 of the manifold 69.

As shown in FIGS. 7, 8 and 9, the first section 71 of the first pipe 19 has, at the second end 21 of the first pipe 19 itself, a first union 73 designed to be quickly connected with the inside of a second union 74 which matches the first and which is located at a connection unit 39 associated to the chuck 7 mounting head 6.

Like the embodiment illustrated in FIGS. 3, 4 and 5, the first and second unions 73, 74 form corresponding connection means, respectively labeled 40 and 41 as a whole, which form a detachable coupling 42 designed to rapidly connect the extraction device 18, and more precisely, the first pipe 19, to a second pipe 43.

The second pipe 43 has a first end 44 leading into the second union 74 through a pipe 75, and a second end 45 connected to a pump 46, schematically represented in FIG. 4 as a block 46, which creates a flow of fluid along the first pipe 19 that sucks out the waste material produced by the tool 10 as it machines the part P.

The pump 46 is connected to a container, schematically represented in FIG. 4 as a block 47, which collects the waste material.

The second pipe 43 and the pump 46 therefore constitute means for producing a flow of fluid at a defined pressure, designed to suck the waste material away from the area B and to convey it to the container 47, thus preventing it from escaping to the atmosphere.

As shown in FIGS. 7 and 8, the end of the second casing 26 facing the first casing 22 is connected to the end of corresponding stems 76 of a pair of linear actuators 77 housed in the first casing 22 and distributed at angular intervals around the first casing 22 on the opposite side of the axis 11 of the spindle 15 and with their axes 78 parallel to the axis 11 itself.

The actuators 77 are connected to a source 79 of fluid under pressure which feeds the actuators 77 and which is controlled by a control unit 80 connected to the control unit (not illustrated) of the machine tool 1 designed to also control the chuck 7 mounting head 6 and the chuck itself. The linear actuators 77 are designed to axially drive the second casing 26 along the path A, substantially parallel to the axis 11 in both directions, labeled F1 and F2 in FIGS. 7 and 8, in such a way that the second casing 26 moves between a position in which it is away from the casing 22 and where the mouth 27 completely covers the tool 10 (this position being illustrated by the continuous line in FIGS. 4 and 8) and a position in which it is close to the first casing 22 and where the tool 10 has moved through the mouth 27 and has finished its work on part P.

In the embodiment illustrated in FIGS. 7 and 8, the extraction device 18 also comprises, in the area B close to the tool 10, an annular cover 81 having a mouth 82 at the front of it, coaxial with the mouth 27 of the second casing 26. The cover 81 is fitted coaxially over the manifold 69 and can move axially relative to the latter between two end positions, namely, a forward limit position in which the mouth 82 is in contact with the part P being machined and is held in contact with the part by a plurality of springs 83 positioned around the manifold 69 and acting between the latter and the cover 81, and a retracted limit position where, following the motion of the second casing 26 relative to the first casing 22, it compresses the springs 83 which, once machining of the part P has been completed, enable the cover 81 to return to the forward limit position illustrated in FIG. 8.

Like the embodiment illustrated in FIGS. 3 and 4, both the cover 81 and the second casing 26 have through holes, labeled 84 and 58, made in them close to the mouth 82 and the mouth 27, respectively. The holes 84 and 58 are designed to connect the area B with the outside atmosphere so as to allow the first pipe 19 to take in air from the outside during the suction stage of the pump 46.

What is claimed is:

1. A tool holder unit for chuck mounting heads used in machining where chips are removed from the worked part and waste material consequently produced, said tool holder unit comprising: a tool holder spindle having a first end which connects with the chuck mounting head and a second end on which a tool is mounted; and an extraction device associated to the tool holder spindle and comprising at least one first pipe having at least one first end located in an area close to the tool and a second end equipped with first connection means designed to connect the first pipe to corresponding second connection means associated to the chuck mounting head and connected to means for producing a flow of fluid at a defined pressure along the first pipe so as to remove the waste material produced by machining from the area close to the tool, said extraction device comprising a first casing having a first inclined surface designed to be quickly attached to a second matching inclined surface made at the second connection means associated to the chuck mounting head; said first and second inclined surfaces forming the first and second connection means which form a detachable coupling designed to rapidly connect the extraction device to the means for producing a flow of fluid.

2. A tool holder unit for chuck mounting heads used in machining where chips are removed from the worked part and waste material consequently produced, said tool holder unit comprising: a tool holder spindle having a first end which connects with the chuck mounting head and a second end on which a tool is mounted; and an extraction device associated to the tool holder spindle and comprising at least one first pipe having at least one first end located in an area close to the tool and a second end equipped with first connection means designed to connect the first pipe to corresponding second connection means associated to the chuck mounting head and connected to means for producing a flow of fluid at a defined pressure along the first pipe so as to remove the waste material produced by machining from the area close to the tool, said first pipe having, at the second end of the first pipe itself, a first union designed to be quickly connected with the inside of a second union which matches the first union and which is located at a connection unit associated to the chuck mounting head; said first and second unions forming the first and the second connection means, which form a detachable coupling designed to rapidly connect the extraction device to the means for producing a flow of fluid at a defined pressure.

3. The unit according to claim 2, wherein the means for producing a flow of fluid at a defined pressure comprise means for sucking the waste material having a second pipe having a first end connected to the second connection means and a second end connected to the sucking means in order to create the flow of fluid.

4. The unit according to claim 1, wherein the means for producing a flow of fluid at a defined pressure comprise means for sucking the waste material having a second pipe having a first end connected to the second connection means and a second end connected to the sucking means in order to create the flow of fluid.

5. The unit according to claim 1, wherein said first casing is fitted coaxially over the tool mounting spindle through suitable coupling means designed to prevent the relative axial movement between the first casing and the tool spindle but allowing the latter to turn freely about its axis; said extraction device further comprising a second casing associated to the first casing and comprising an end mouth which is coaxial with the tool mounting spindle and through which the tool can pass; the second casing being able to move axially relative to the first casing and relative to the spindle between a first position in which it is away from the first casing and where the mouth covers the tool and a position in which it is close to the first casing and where the tool has moved through the end mouth.

6. The unit according to claim 5, wherein the first casing comprises a peripheral through aperture having a first end, located at the first connection means and a second end facing the second casing which comprises a first section of the first pipe; the first section of the first pipe starting at the area close to the tool and ending at a corresponding end portion of the second casing facing the first casing; the first section of the first pipe being connected to the aperture through sealed connecting means.

7. The unit according to claim 6, wherein the sealed connecting means comprise a sleeve having a first end fixed to the first section of the first pipe, and a second end joined by a sealed connection to the second end of the through aperture and able to slide inside the aperture during the axial movement of the second casing relative to the first casing.

8. The unit according to claim 5, wherein, in the area close to the tool, the extraction device comprises a through hole made in the second casing close to the end mouth and designed to connect with the outside atmosphere the area close to the tool.

9. The unit according to claim 5, wherein the extraction device comprises, at the end mouth, at least one radial groove made in the outer wall of the end mouth itseif and designed to connect with the outside atmosphere the area close to the tool.

10. The unit according to claim 2, wherein said first casing is fitted coaxially over the tool mounting spindle through suitable coupling means designed to prevent the relative axial movement between the first casing and the tool spindle but allowing the latter to turn freely about its axis; said extraction device further comprising a second casing associated to the first casing and comprising an end mouth which is coaxial with the tool mounting spindle and through which the tool can pass; the second casing being able to move axially relative to the first casing and relative to the spindle between a first position in which it is away from the first casing and where the mouth covers the tool and a position in which it is close to the first casing and where the tool has moved through the end mouth.

11. The unit according to claim 5, wherein the first casing comprises: a tubular portion which is coaxial with the tool mounting spindle and over which the second casing is slidably fitted; slide means that support and guide the second casing; and spring means acting between the first and second casings and designed to keep the second casing in its second limit positionwhere it is away from the first casing.

12. The unit according to claim 10, wherein the first casing comprises, at an end facing the tool, at least one first radial aperture, the second tubular casing being coaxial with the first casing and having at least one second lateral aperture located in a position coinciding with the position of the first radial aperture, in such a way that, during the movement of the second casing relative to the first casing the first and second apertures are aligned.

13. The unit according to claim 12, wherein the extraction device comprises an annular manifold fitted coaxially and partially over both the first casing and over the second casing which can slide axially relative to it, said manifold having a radial aperture connecting a first tubular section of the pipe, extending from the aperture to the second end of the first pipe itself; the first end of the pipe being connected to the aperture through the first and second apertures; said first and second apertures forming a section of the first pipe extending between the first end of the first pipe and the radial aperture of the manifold.

14. The unit according to claim 10, wherein, in the area close to the tool, the extraction device comprises a through hole made in the second casing close to the end mouth and designed to connect with the outside atmosphere the area close to the tool.

15. The unit according to claim 10, wherein the first casing comprises: a tubular portion which is coaxial with the tool mounting spindle and over which the second casing is slidably fitted; slide means that support and guide the second casing; and spring means acting between the first and second casings and designed to keep the second casing in its second limit position where it is away from the first casing.

16. The unit according to claim 13, wherein the extraction device comprises a cover, having a mouth at the front of it, the cover being fitted over the manifold and being axially mobile relative to the latter between two end positions, namely, a forward limit position and, following the motion of the second casing relative to the first casing, a retracted limit position; the cover being kept in the forward position by corresponding elastic means acting between the manifold and the cover.

17. The unit according to claim 16, wherein the cover has at least one through hole designed to connect the area with the outside atmosphere.

* * * * *